Aug. 25, 1964  R. B. KERSHNER  3,145,948
SATELLITE ROTATION BY RADIATION PRESSURE
Filed July 9, 1962  2 Sheets-Sheet 1

RICHARD B.
KERSHNER
INVENTOR

Aug. 25, 1964  R. B. KERSHNER  3,145,948
SATELLITE ROTATION BY RADIATION PRESSURE
Filed July 9, 1962  2 Sheets-Sheet 2
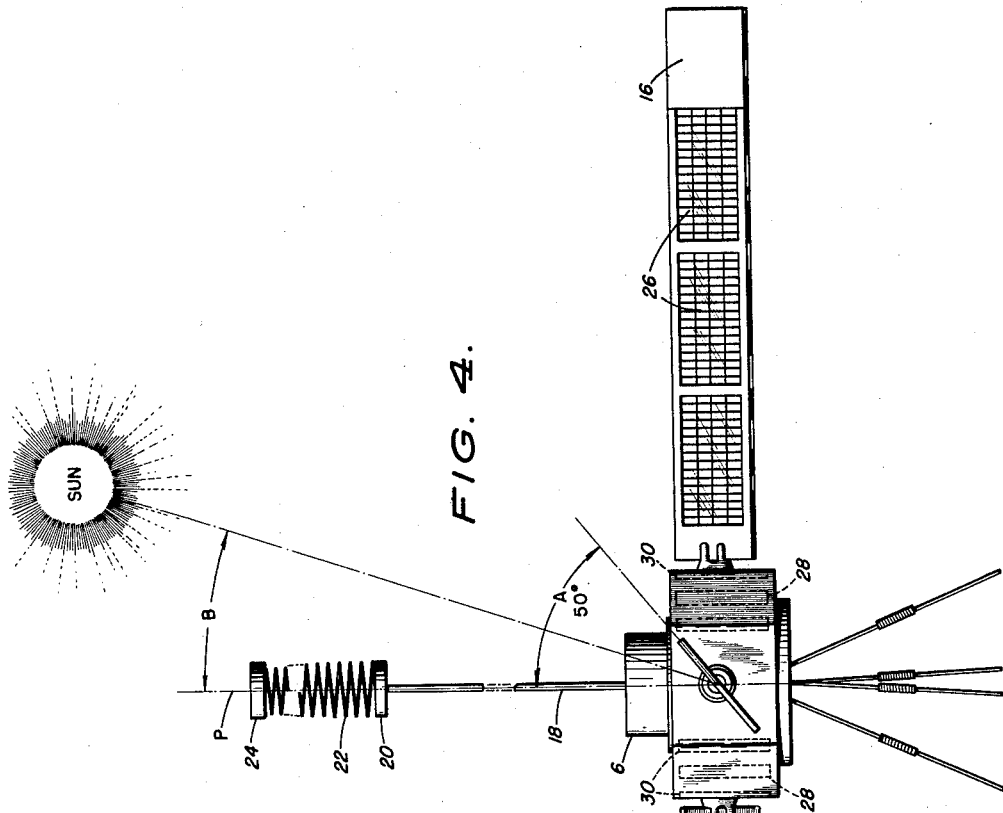
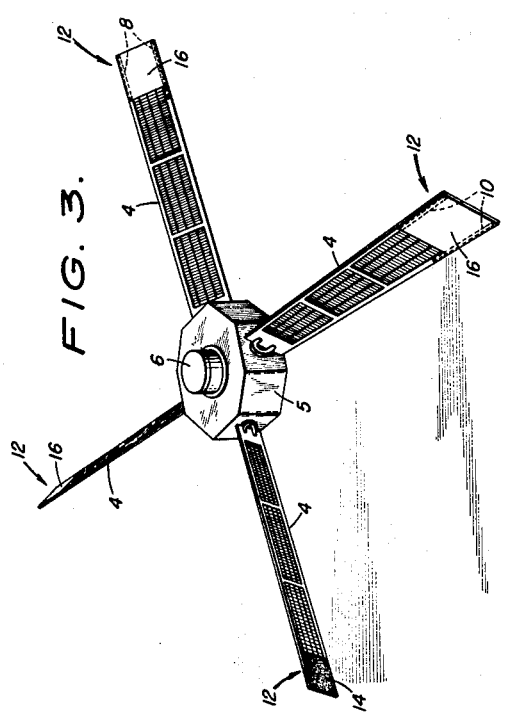
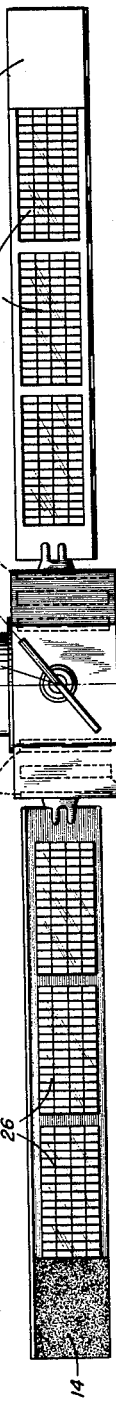
RICHARD B. KERSHNER
INVENTOR
BY
ATTORNEYS ns Patent Office 3,145,948
Patented Aug. 25, 1964

3,145,948
SATELLITE ROTATION BY RADIATION
PRESSURE
Richard B. Kershner, Silver Spring, Md., assignor to the United States of America as represented by the Secretary of the Navy
Filed July 9, 1962, Ser. No. 208,654
8 Claims. (Cl. 244—1)

This invention relates to satellite attitude control systems and, more particularly, to a satellite rotation system utilizing solar radiation pressure panels for inducing a controlled spin to the satellite.

Generally, the principal axis of a satellite can assume any random attitude towards the earth or the sun when it is placed in orbit. However, such a random alignment of the satellite's principal axis is normally undesirable when viewed from the purpose for placing the satellite in orbit. In a navigation, communication, or reconnaissance satellite it is desirable to know the orientation of the satellite with respect to the earth, and if possible to maintain a permanent orientation with the earth. If a permanent orientation can be obtained, it then becomes possible to place the satellite's antennas or directional equipment on the side of the satellite that will always be facing the earth.

A satellite can be magnetically stabilized about an axis thereof with the earth's magnetic field in a manner as described by Fischell et al., "Magnetic Satellite System," Serial No. 99,644, filed March 30, 1961, now Patent No. 3,118,637. Such a satellite will tumble in the plane of its stabilized axis as it follows the earth's magnetic field. The rate of tumble for a magnetically stabilized satellite is two revolutions for every orbit of the earth. Actually, the tumbling is caused by an axis of the satellite aligning itself with the magnetic field of the earth, and then turning with the field as the satellite orbits the earth.

This tumbling motion exposes some of the surface area of the satellite to the direct rays of the sun, thereby providing an even distribution of heat over a portion of the area of the satellite and tending to keep the satellite's internal temperature constant.

Rotation of the satellite about its stabilized axis, which can be done by this invention, will cause all the surface of the satellite to be exposed to the sun. Without this additional rotation, a satellite could very possibly be in an orbit relative to the sun such that only one portion of the satellite would be exposed to the sun, notwithstanding the tumbling caused by magnetic stabilization.

Additionally, the solar cells used to generate the electrical energy for charging batteries and for operating radio transmitters, and other equipment in the satellite, will be exposed to a corresponding increase of solar radiation when the satellite is rotated for maximum sun exposure. This tends to regulate the charging current to the batteries and assures that they will be kept at a constant full charge.

A satellite can be gravitationally oriented with the earth in a manner as described by Robert R. Newton in his patent application entitled System for Gravity Orienting a Satellite, Serial No. 249,961, filed January 7, 1963. Such an oriented satellite will always present its same side towards the earth. This type of oriented satellite is more susceptible to adverse heating effects and insufficient electrical energy generation than is a magnetically oriented satellite because of its unchanging relationship with the earth and its slightly changing relationship with the sun. However, these difficulties can be corrected by using this invention to induce rotation about the gravity stabilized axis. This rotation of the satellite will expose more surface area of the satellite to the direct rays of the sun, and therefore will tend to maintain a constant internal temperature. For a satellite having its solar cells mounted on blades extending outwardly from the main satellite body, the sun could very possibly be in such a position that less than all of the surface area of the blades would be exposed to direct solar radiation. The rotational effect will expose all the blades, and will therefore increase the output from the solar cells mounted thereon.

One object of the present invention, therefore, resides in providing a rotational force for a stabilized orbiting satellite.

Another object of the invention is to provide a uniform flow of charging currents to all the satellite batteries by inducing a controlled spin to the satellite and providing solar illumination to all of the solar cells.

A further object of the invention is to provide a reliable passive rotation system for use in a space environment.

Other objects and many of the attendant advantages of this invention will be readily appreciated as the same becomes better understood by reference to the following detailed description when considered in connection with the accompanying drawings, wherein:

FIG. 3 is a schematic representation of a satellite constructed according to the present invention; and FIG. 4 is a side elevation of a satellite utilizing the invention.

Briefly, this invention consists of a satellite magnetically stabilized by either a permanent magnet or an electro-magnet, or gravitationally stabilized by an extended boom and a weight positioned at the end of the libration dampening spring connected to the end of the extended boom. Four uniformly spaced blades extend out from the sides of the satellite body and mount the solar cells that generate electrical energy for operating radio transmitters and other equipment in the satellite. A single solar panel is mounted near the outer end of each blade. One of its sides is painted white, and the other is painted black. The solar panels are so arranged near the outer end of each blade that the white side of each panel is facing the black side of the panel on the next blade of the satellite, when the satellite is viewed from the top. Thus, when the satellite is viewed from the sun a blade on one side of the satellite will always be relatively lighter in color than the blade on the opposite side of the satellite.

Light falling upon the black area of a solar panel imparts momentum only in the direction of the impact because the black area will absorb the photons in the light rays. A white area can be considered as reflecting the photons in the light, and hence receiving a momentum normal to the surface which is the sum of an impact force and a reflection force. Therefore, of the two surface areas of the blades directly facing the sun, a white one will have twice as much light pressure exerted on it as a black one. Because of this a resulting rotational force is developed by the sun acting on diametrically opposed black and white panels which tends to turn the satellite about its stabilized axis in a direction such as to push the white panel away from the sun.

Figure 1:
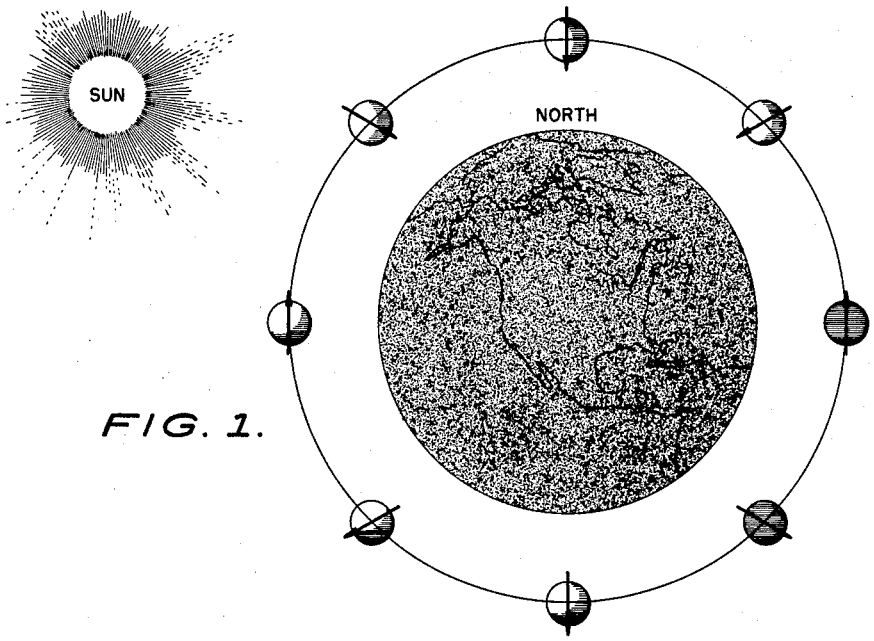
FIG. 1 is a schematic representation of the angular excursions of a magnetically stabilized satellite in a polar orbit.

Referring to FIG. 1, there can be seen a magnetically stabilized satellite in a polar orbit about the earth. The arrow extending through the satellite represents the principal axis of the satellite, and the arrowhead represents the top side of the satellite. This figure illustrates how the satellite tumbles in the plane of its principal axis. As is readily seen from the figure, in each orbit of the earth the sun shines for long periods of time upon the same side of the satellite.

Figure 2:
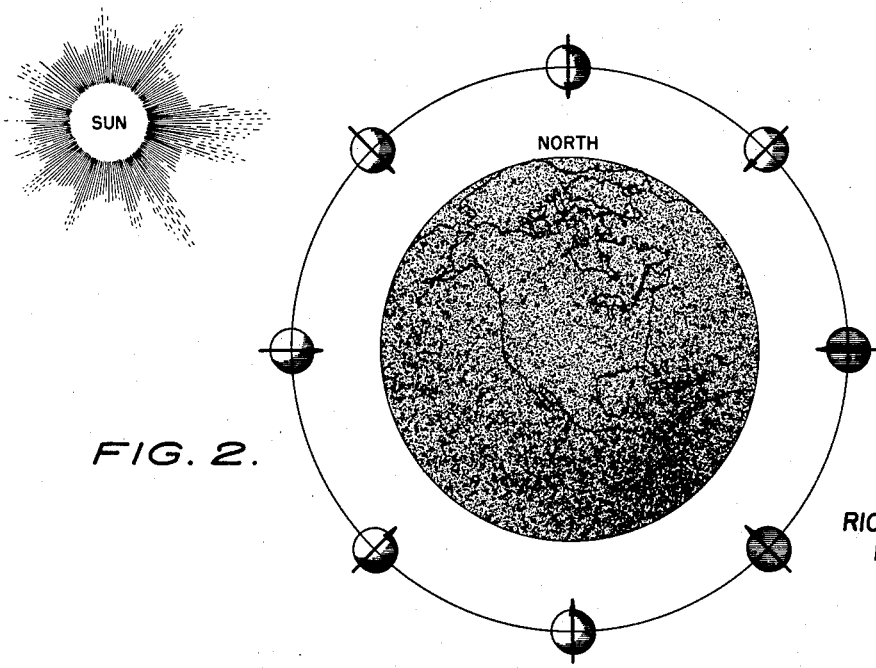
FIG. 2 is a schematic representation showing the uniform relationship between the earth and a gravitationally stabilized satellite.

Referring to FIG. 2, there can be seen a gravitationally stabilized satellite orbiting the earth. The arrow through the satellite again represents the principal axis, and the arrowhead in this instance represents the bottom of the satellite. The bottom of the satellite is always facing the earth, and the sun shines principally on one face of the satellite for long periods of time.

This invention has thus far been described in connection with either a magnetically stabilized satellite or a gravitationally stabilized satellite, but it will function equally well with a satellite having a combination of the two stabilization techniques during the period of an orbit, when the two stabilization techniques are themselves compatible.

In FIG. 3, a satellite is shown having four blades 4 extending outwardly from the sides of the satellite body 5. A boom housing 6, positioned atop the body, contains the mechanism used to gravitationally orient the satellite. A pair of despin rods 8 is located within one blade 4 and a second pair 10 is located within another blade 4 that extends perpendicularly out from the line of the first blade. A solar pressure panel 12 is positioned at the end of each blade. Each panel has one side 14 which is painted black, while its other side 16, is painted white. As previously stated, the black surface of one panel generally faces the white surface of an adjacent panel, whereby black and white panel sides alternate around the satellite periphery. Although it is possible to paint opposite sides of the blade itself black and white, it is also feasible to attach separately prepared panels to the blade to provide the black and white surfaces.

Referring to FIG. 4, it can be seen that each blade 4 is oriented to lie in a plane that forms a 50 degree angle A with the principal axis P of the satellite body. Although this angle is not critical, it is chosen to ensure that the sense of rotation imparted to the satellite is the same regardless of the satellite-sun angle B, that lies between the principal axis of the satellite and the satellite-sun line. The angle A may not be 45 degrees as there would then be no resulting torque imparted to the satellite when the sun was directly facing a side of the satellite, because the impact momentum of the photons on the white surface would cancel the absorption momentum imparted to the black area, while the reflected momentum would be dispersed; thus, there would be no resulting torque tending to rotate the satellite. The angle A may not be zero degrees or 90 degrees, because when the sun is facing an edge of the solar panels their effectiveness fails. Since it is desirable to have an induced rotation for a satellite-sun angle B, an angle of 50 degrees was chosen.

Referring again to FIG. 4, the boom housing 6 is shown with its boom 18 in the extended position. A weight 20 is positioned on the end of the boom 18 and a vibrational damping spring 22, with its own weight 24 attached to one end thereof, is connected to the weight 20. A plurality of solar cells 26 is mounted on each blade 4 and generates electrical energy to charge a plurality of batteries 28 disposed within the body 5. The batteries 28 will furnish the power to operate a plurality of electromagnets 30 which form a part of the magnetic stabilization system, as described in Fischell et al. "Magnetic Satellite System," application Serial No. 99,644, filed March 30, 1961, now Patent No. 3,118,637.

In operation, the despin rods located within two of the erected blades will eliminate the angular rotation of the satellite body that was induced during the launching of the satellite. Then, the satellite will be either gravitationally or magnetically oriented with respect to the earth. A magnetically oriented satellite will tumble in the plane of its stabilized axis as it follows the magnetic field of the earth, and will rotate about this axis under the influence of the solar pressure panels. This rate of rotation continues to increase until gyroscopic torques prevent the magnetic stabilization system from following the magnetic field lines of the earth. Then, the satellite will assume an attitude toward the earth in which the despin rods will oppose any further increase in the rate of rotation. A rate of rotation will be attained for exposing all of the solar cells to sunlight during each orbit of the earth, with the result that all of the batteries will be maintained fully charged.

A gravitationally oriented satellite will always have the same side facing the earth. Therefore, the solar cell area exposed to the sun may be the minimum exposure for any particular orbit. By inducing controlled rotation about the gravitationally stabilized axis, all the solar cells will be exposed to the sun during one orbit of the satellite about the earth, and the satellite batteries will remain fully charged.

The method of attaining gravity orientation includes a period of magnetic orientation when the satellite is directly above the north pole. During the period of magnetic orientation, the bottom of the satellite is facing the earth, and the top is pointed directly away from the earth. In this position, the gravity orientation mechanism is fully extended and thereafter controls the orientation of the satellite because the magnetic controls are deactivated.

Obviously, many modifications and variations of the present invention are possible in the light of the above teachings. It is therefore to be understood that within the scope of the appended claims the invention may be practiced otherwise than as specifically described.

What is claimed is:
1. The method of imparting rotation to a stabilized orbiting satellite, which comprises the steps of
    (a) projecting flat-sided blades from the satellite,
    (b) angulating the blades in the same spin sense with respect to the spin axis of the satellite, and
    (c) pointing the spin axis in the direction of the sun, whereby solar pressure will impinge on the blades.
2. In a satellite,
    means for gravitationally stabilizing the satellite about an axis of rotation in orbit,
    said satellite having a plurality of radially extending blades,
    means on certain of the blades for magnetically stabilizing the satellite, and
    means on the blades and responsive to solar pressure for imparting rotation to the satellite about its stabilized axis of rotation.
3. A satellite as recited in claim 2, wherein
    said second-mentioned means comprises a pair of spaced magnetically permeable rods mounted in the outer end portions of a pair of adjacent blades.
4. A satellite as recited in claim 2, wherein
    said second-mentioned means is constituted by a pair of magnetically permeable rods mounted in the outer end portions of adjacent blades, the rods of each pair being arranged in spaced relation to each other lengthwise of the blades.
5. In a satellite,
    a body,
    a boom housing on the body,
    a boom on the housing and extensible therefrom,
    a weight on the outer end of the boom,
    means attached to the weight and cooperating with the boom and said weight for gravitationally stabilizing the satellite about an axis of rotation in orbit,
    a plurality of blades mounted on the body and extending in a plane at right angles to the boom axis and at right angles to each other,
    solar cells on the blades,
    magnetic stabilization means for the satellite,
    said magnetic stabilization means being mounted in certain of the blades near their corresponding outer ends, and solar pressure panels on the blades near their outer ends for imparting rotative torque to the satellite about its gravitationally stabilized axis whereby the solar cells will be exposed to the sun throughout the satellite's orbit.

6. A satellite as recited in claim 5, wherein the blades are each oriented on the body at an angle to the gravitationally stabilized axis of said satellite sufficient to cause continuous unidirectional rotation independent of the satellite-sun angle.

7. In a satellite,
a body,
means on the body for gravitationally stabilizing the satellite in orbit,
blades extending from the body at right angles to each other and in the same plane,
solar cells on the blades,
magnetically permeable rods on a pair of adjacent blades near their outer end portions,
said rods providing magnetic stabilization for the satellite, and
solar pressure responsive means on corresponding sides of the blades near the outer ends thereof,
said blades being angled with respect to the gravitational spin axis whereby rotation will be imparted to the satellite by solar pressure impinging on said solar pressure responsive means for exposing the solar cells to the sun throughout the satellite's orbit.

8. A satellite as recited in claim 7,
wherein said first-mentioned means comprises a boom, and
said solar pressure responsive means comprise wave absorptive and wave reflective panels on alternate blades.

References Cited in the file of this patent
UNITED STATES PATENTS

| | | |
|---|---|---|
| 182,172 | Crookes | Sept. 12, 1876 |
| 3,031,154 | Roberson | Apr. 24, 1962 |
| 3,057,579 | Cutler | Oct. 9, 1962 |
| 3,061,239 | Rusk | Oct. 30, 1962 |